(12) United States Patent
Gredilla

(10) Patent No.: US 11,526,757 B2
(45) Date of Patent: Dec. 13, 2022

(54) SYSTEMS AND METHODS FOR DEEP LEARNING WITH SMALL TRAINING SETS

(71) Applicant: Intrinsic Innovation LLC, Mountain View, CA (US)

(72) Inventor: Miguel Lazaro Gredilla, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/560,000

(22) Filed: Dec. 22, 2021

(65) Prior Publication Data

US 2022/0114452 A1    Apr. 14, 2022

Related U.S. Application Data

(63) Continuation-in-part of application No. 15/708,383, filed on Sep. 19, 2017, now abandoned.

(60) Provisional application No. 62/396,657, filed on Sep. 19, 2016.

(51) Int. Cl.
*G06N 3/08* (2006.01)
*G06N 3/04* (2006.01)

(52) U.S. Cl.
CPC ............ *G06N 3/08* (2013.01); *G06N 3/0454* (2013.01)

(58) Field of Classification Search
CPC ................................ G06N 3/08; G06N 3/0454
See application file for complete search history.

(56) References Cited

U.S. PATENT DOCUMENTS

| | | |
|---|---|---|
| 2009/0232403 A1 | 9/2009 | Waragai et al. |
| 2016/0026261 A1 | 1/2016 | Cheng et al. |
| 2016/0162805 A1 | 6/2016 | Kwon |
| 2016/0260009 A1 | 9/2016 | George et al. |
| 2016/0260010 A1 | 9/2016 | George et al. |
| 2016/0267375 A1 | 9/2016 | George et al. |
| 2016/0379044 A1* | 12/2016 | Tang ............... G06V 10/44 382/118 |
| 2017/0083747 A1* | 3/2017 | Guan ............... G06V 20/13 |
| 2018/0075599 A1* | 3/2018 | Tajbakhsh ......... G06T 7/0012 |

OTHER PUBLICATIONS

Xu, Zijian, et al. "A hierarchical compositional model for face representation and sketching." IEEE Transactions on Pattern Analysis and Machine Intelligence 30.6 (2008): 955-969. (Year: 2008).*
Rastegari, Mohammad, et al. "Xnor-net: Imagenet classification using binary convolutional neural networks." European conference on computer vision. Springer, Cham, 2016. (Year: 2016).*
Xu, Zijian, et al., "A hierarchical compositional model for face representation and sketching", IEEE Transactions on Pattern Analysis and Machine Intelligence 30.6 (2008): 955-969.
Rastegari, Mohammad, et al., "XNOR-Net: ImageNet Classification Using Binary Convolutional Neural Networks", European Conference on Computer Vision, Springer, Cham. 2016.

* cited by examiner

*Primary Examiner* — Kevin W Figueroa
(74) *Attorney, Agent, or Firm* — Fish & Richardson P.C.

(57) ABSTRACT

A hierarchical compositional network, representable in Bayesian network form, includes first, second, third, fourth, and fifth parent feature nodes; first, second, and third pool nodes; first, second, and third weight nodes; and first, second, third, fourth, and fifth child feature nodes.

21 Claims, 19 Drawing Sheets

SYSTEMS AND METHODS FOR DEEP LEARNING WITH SMALL TRAINING SETS

CROSS-REFERENCE TO RELATED APPLICATIONS

This application is a continuation in part of U.S. application Ser. No. 15/708,383, filed on Sep. 19, 2017, which claims the benefit of U.S. Provisional Application Ser. No. 62/396,657, filed on Sep. 19, 2016, each of which is incorporated in its entirety by this reference.

This application is related to U.S. application Ser. No. 14/822,730, filed Aug. 10, 2015, which is incorporated herein in its entirety by this reference.

TECHNICAL FIELD

This invention relates generally to the artificial intelligence field, and more specifically to new and useful systems and methods for deep learning with small training sets for neural networks in the artificial intelligence field.

BACKGROUND

Despite advances in computer vision, image processing, and machine learning, recognizing visual objects remains a task where computers fail in comparison with the capabilities of humans. Recognizing an object from an image not only requires recognizing the object in a scene but also recognizing objects in various positions, in different settings, and with slight variations. For example, to recognize a chair, the innate properties that make a chair a chair must be understood. This is a simple task for a human. Computers struggle to deal with the vast variety of types of chairs and the situations in which a chair may be present. Models capable of performing visual object recognition must be trained to provide explanations for visual datasets in order to recognize objects present in those visual datasets. Unfortunately, most methods for training such models either fall short in performance and/or require large training sets.

This issue is not confined solely to visual object recognition, but more generally applies to pattern recognition, which may be used in speech recognition, natural language processing, and other fields. Thus, there is a need in the artificial intelligence field to create new and useful systems and methods for deep learning with small training sets. This invention provides such new and useful systems and methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. Neural Networks and Related Systems

Neural networks and related systems, including recursive cortical networks (RCNs), convolutional neural networks (CNNs), hierarchical compositional networks (HCNs), HMAX models, Slow Feature Analysis (SFA) systems, and Hierarchical Temporal Memory (HTM) systems may be used for a wide variety of tasks that are difficult to complete using standard rule-based programming. These tasks include many in the important fields of computer vision and speech recognition.

Neural networks and related systems can be represented as distributed processing elements that implement summation, multiplication, exponentiation or other functions on the elements incoming messages/signals. Such networks can be enabled and implemented through a variety of implementations. For example, a system may be implemented as a network of electronically coupled functional node components. The functional node components can be logical gates arranged or configured in a processor to perform a specified function. As a second example, the system may be implemented as a network model programmed or configured to be operative on a processor. The network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data.

In particular, convolutional neural networks (CNNs) may be useful for performing inference on data for which feature recognition is independent of one or more dimensions of the data; for example, when detecting shapes in an image, the detected shapes are not dependent on their position in the image—the same features used to detect a square in one part of the image may be used to detect a square in another part of the image as well. These dimensions may be spatial (as in the 2D image example), but may additionally or alternatively be temporal or any suitable dimensions (e.g., a frequency dimension for audio or multispectral light data).

Figure 1A:
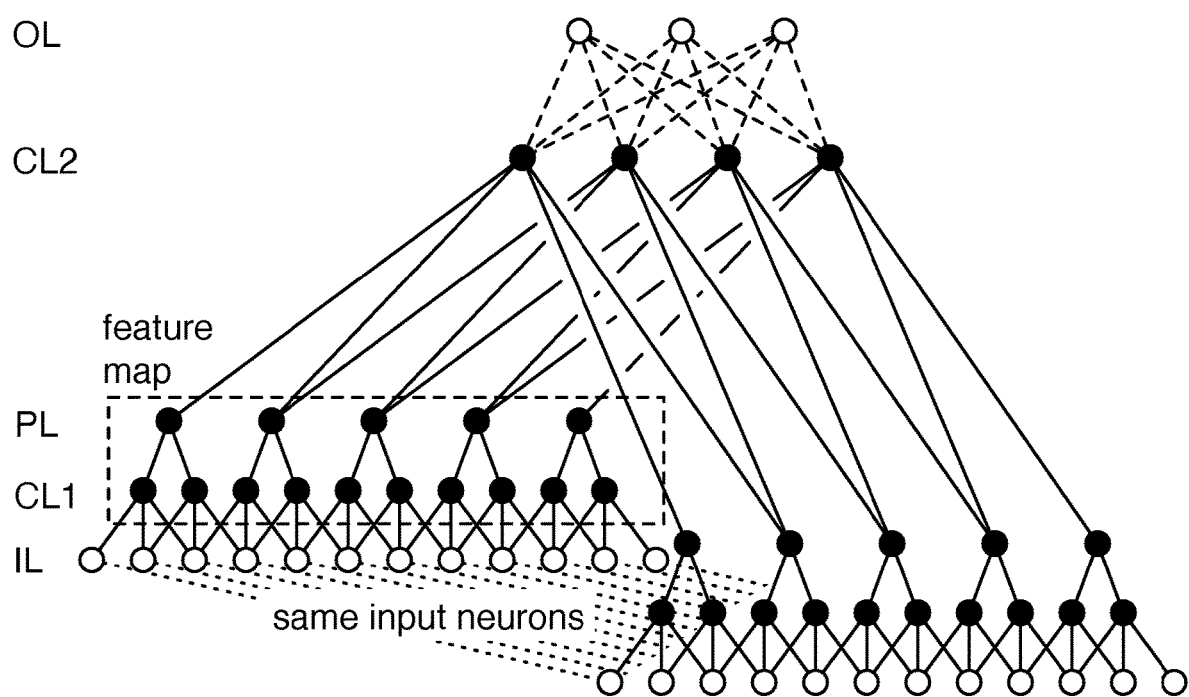
FIGS. 1A and 1B are schematic representations of a convolutional neural network.
Figure 1B:
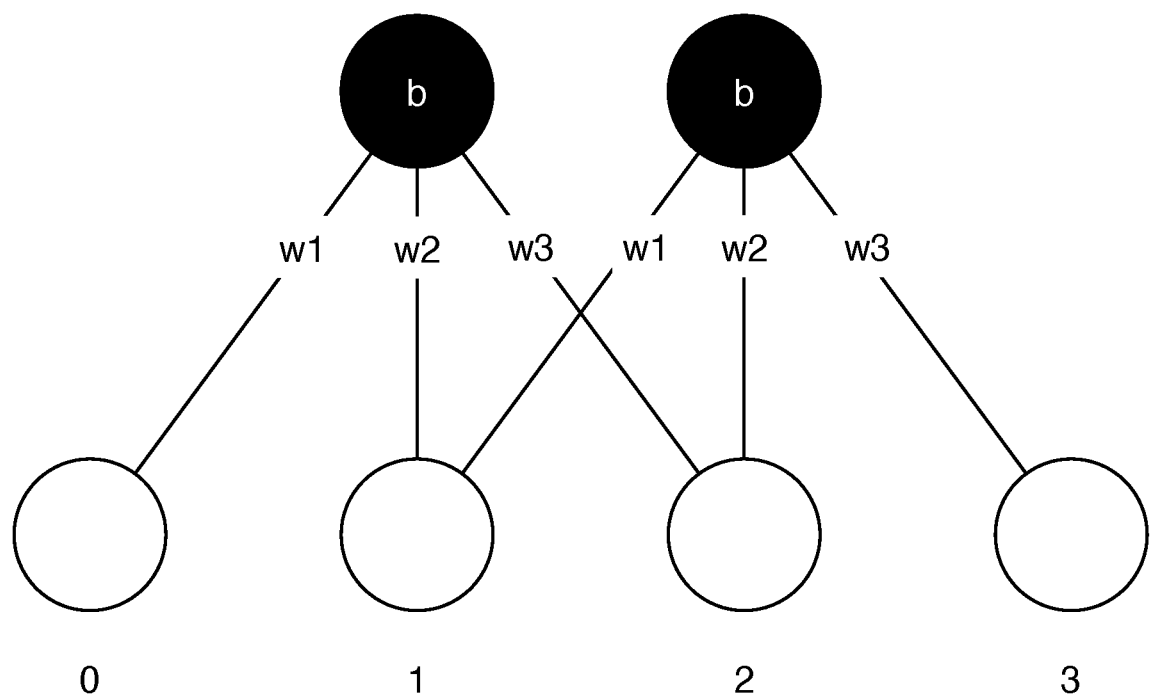

CNNs, as shown in FIG. 1A, take advantage of the dimensional structure of data by connecting neurons only to a small region of input data, selected using the previously mentioned dimensionality of the data. These regions are referred to as local receptive fields. A set of neurons, each neuron connected to a receptive field of neurons below it, as well as the output of that set of neurons, is referred to as a feature map. In a CNN, feature maps are unique in that they have shared weights; that is, each neuron of a given feature map (which corresponds to the same feature, but shifted across the data dimensions) is constrained to have the same input weights and biases as the other neurons of that feature map, as shown in FIG. 1B. Of course, it is often desirable for a given layer to have multiple feature maps (each able to correspond to a different feature). The layer containing the multiple feature maps is referred to as a convolutional layer (so called because the output of a neuron in the layer is a convolution operation performed on the inputs).

CNNs may also include pooling layers, which function to reduce the size of the output of a set of neurons (typically the output of a convolutional layer, but pooling layers may be used for any set of neurons; e.g., on top of the input neurons). For example, a pooling layer may take the maximum activation of a set of neurons as an output (i.e., max-pooling). Pooling layers are applied to each feature map separately. Commonly, pooling layers are used between convolutional layers in CNNs. CNNs also may include other layers, such as input layers, output layers, etc.

As shown in FIG. 1A, an example CNN includes an input layer IL, a first convolutional layer CL1, a pooling layer PL, a second convolutional layer CL2, and an output layer OL. The input neurons in the input layer are connected to two feature maps in CL1 (note that while two sets of input neurons are shown, this is for display purposes only—the neurons of the first feature map and of the second feature map are connected to the same input neurons). As shown, CL1 has a receptive field of 3.

Each feature map is in turn connected to a set of pooling neurons in PL. As shown, PL has a pooling window of 2.

The output of PL is used as an input to the second convolution layer CL2, which has a receptive field of 2. Note here that each neuron of CL2 connects to each feature map of CL1/PL; in other words, the feature map of CL2 (there is only one as shown in FIG. 1A) is a combination of all feature maps in CL1. This is typical of CNNs; generally, in a CNN, all feature detectors in a convolutional layer have access to all features from the previous convolutional layer.

Finally, the output of CL2 is used as input to the output layer OL. Note here that OL is fully connected to CL2.

By limiting neural network connections via exploiting the locality of the receptive fields according to data dimensionality, CNNs can perform inference with a fraction of the complexity required by an older fully-connected model. However, training CNNs often requires a substantially large training set and CNNs may be 'fooled' by certain images (as the number of training samples may be poorly representative of the very high dimensional input space).

2. Hierarchical Compositional Network (HCN)

Figure 2:
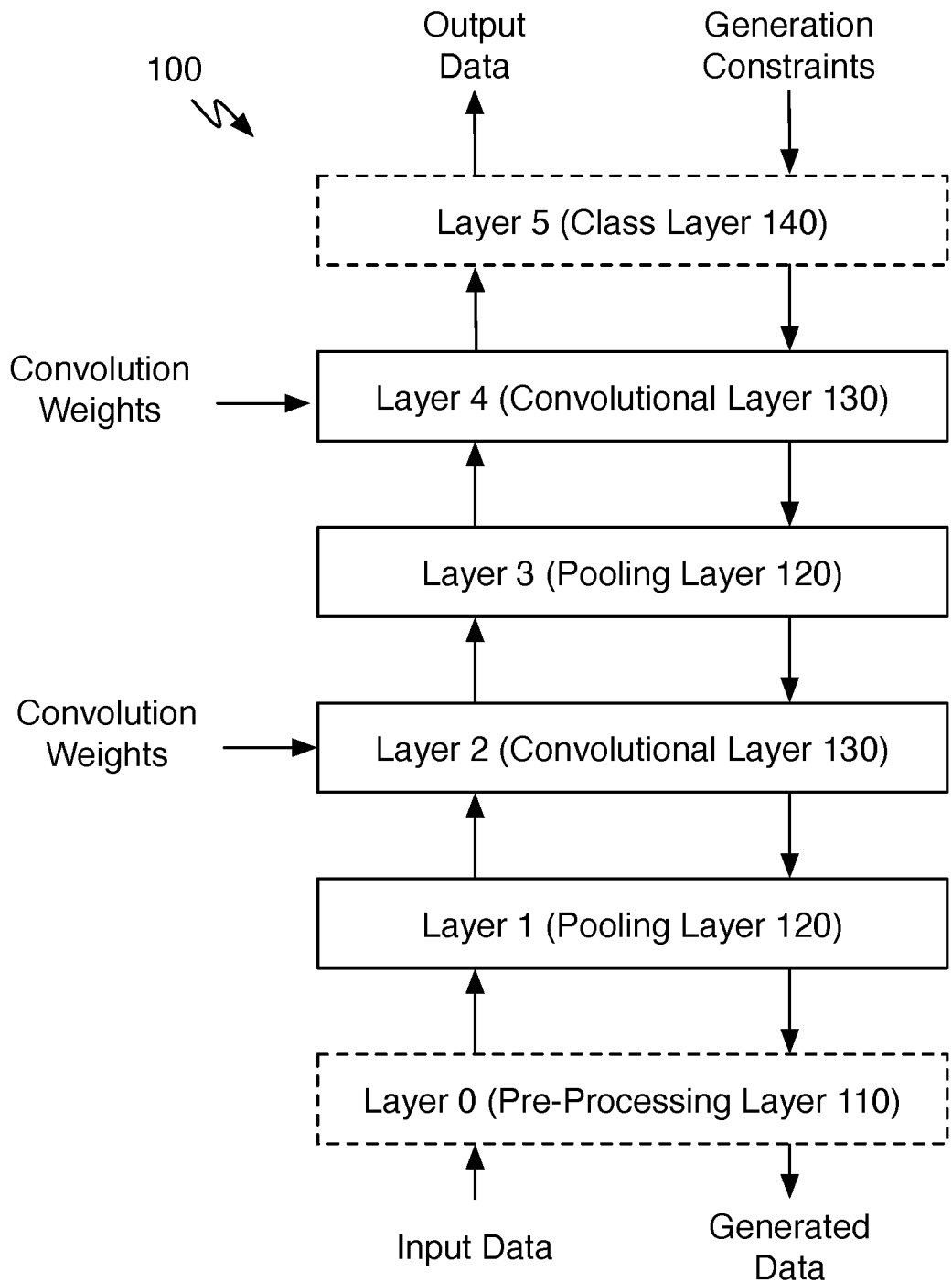
FIG. 2 is a schematic representation of a hierarchical compositional network of an invention embodiment.

A Hierarchical Compositional Network (HCN) 100 includes a set of pooling layers 120 and a set of convolutional layers 130, as shown in FIG. 2. The HCN 100 may additionally include a pre-processing layer no and/or a class layer 140.

The HCN 100 is a neural network based on a generative model (unlike a standard feed-forward CNN, which is based on a discriminative model) that incorporates some of the structural biases of the previously described CNN. For instance, like a CNN, the HCN 100 preferably takes advantage of the dimensional structure of data by connecting neurons only to a small region of input data, selected using properties of dimensions of the data (e.g., the x and y location of pixels in image data).

In addition, the specific architecture of the HCN 100 enables the HCN 100 to create images by composing parts, introduce variability through pooling, and perform explaining away during inference. Training of the HCN 100 (discussed in further detail on the section of the method 200) may be performed in both supervised and unsupervised scenarios; after training, discrimination can be achieved via a fast forward pass with the functional form of a CNN. This is a unique aspect enabling the HCN 100 to capture advantages of both CNNs (which are discriminative) and non-HCN generative models.

Figure 3:
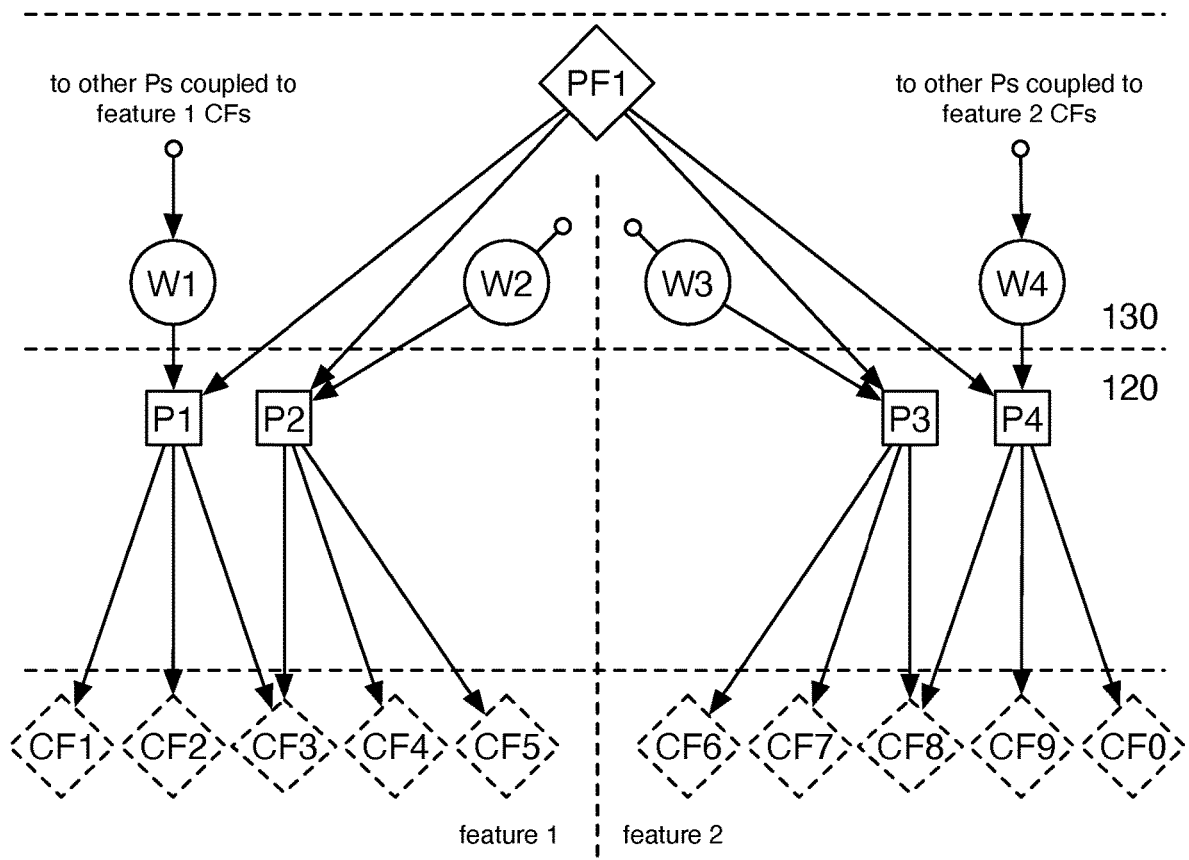
FIG. 3 is a Bayesian network representation of a subnetwork of a hierarchical compositional network of an invention embodiment.

As shown in FIG. 3, the HCN 100 may include a plurality of sub-networks, represented here by a Bayesian network graph. A sub-network preferably includes at least a parent feature node (PF), a pool node (P), and a weight node (W). The HCN 110 may be configured for different operational modes, including a first mode of operation: generation mode, and a second mode: inference mode. The HCN 110 is preferably a hierarchically organized network of interconnected sub-networks in various parent-child relationships. The HCN 110 may alternatively be a single layer of a collection of sub-networks or a single sub-network.

Various instances and instantiations of HCN sub-networks are preferably constructed, connected, and used recursively in the hierarchy of the HCN 110. The architecture of the hierarchical network may be constructed in any manner. The HCN 100 preferably includes alternating convolutional layers 130 and pool layers 120 (alternatively the layers of the HCN 100 may be arranged in any manner). The sub-networks have feature input nodes and feature output nodes, and the feature nodes are used to bridge or connect the sub-networks. Each node of the hierarchical network will preferably have parent node connections and child node connections. Generally, the parent node connections are preferably inputs during generation and outputs during inference. Conversely, the child node connections are outputs during generation and inputs during inference. In the variation of a single layer (or non-hierarchical) sub-networks are arranged as siblings.

The sub-networks may be set up in a variety of different configurations within a network. Many of the configurations are determined by constraint nodes that define the node-selection within a sub-network, between sub-networks, or even between networks. Additionally, sub-networks can be set up to have distinct or shared child features. The sub-networks are additionally arranged in hierarchical layers. In other words, a first sub-network may be the parent of a second sub-network. Similarly, the second sub-network may additionally be the parent of a third sub-network. The layers of sub-networks are preferably connected through shared parent feature nodes and child feature nodes. Preferably, a child feature node of a top layer sub-network is the parent feature node of a lower sub-network. Conversely, the parent feature nodes of a sub-network can participate as the child feature nodes of a higher sub-network. The parent feature nodes of the top-level sub-networks are preferably the inputs into the system. The child features of the bottom/lowest sub-networks are preferably the outputs of the system. Connecting multiple sub-networks can introduce multi-parent interactions at several nodes in the network. These interactions can be modeled using different probabilistic models in the nodes.

Connecting the sub-networks in a hierarchy can function to promote compact and compressed representations through sub-network re-use. Parent feature nodes of one sub-network can participate as child feature nodes in multiple parent sub-networks. A similar benefit is that invariant representations of a child sub-network can be re-used in multiple parent sub-networks. One example of where this would be applicable is in the case of an HCN 110 representing visual objects. The lower-level sub-networks can correspond to parts of objects and the higher level sub-networks (i.e., upper layer sub-networks) can represent how those parts come together to form the object. For example, the lower level sub-networks can correspond to representations for the body parts of an image of a cow. Each body part will be invariantly represented (enabled by pooling layers 120) and will be tolerant to location transformations like translations, scale variations, and distortions. The higher-level sub-network then will specify how the body parts come together to represent a cow. Some of the lower-level body parts of a cow could be re-used at a higher level for representing a goat. For example, the legs of both of these animals move similarly and hence those parts could potentially be re-used. This means that the invariant representations learned for the legs of cows can be automatically re-used for representing goats.

The HCN 110 may be used both for generating data explanations (e.g. classifying objects in an image) and for generating data predictions (e.g. an image containing some set of objects). During data explanation generation, nodes of the HCN 110 preferably operate on input data features and propagate the node selection/processing through the hierarchy of the HCN 110 until an output is obtained from a parent feature of a top-layer sub-network. A combination of propagating information up in the hierarchy (to higher parent layers) and downwards (towards the final child features) may be used to accomplish this output. During data prediction generation, the HCN 110 preferably starts from a general generation request that is directed, fed, or delivered to the parent feature nodes of the top layer sub-networks. The nodes preferably operate on the information and propagate the node selection/processing down the hierarchy of the HCN 110 until an output is obtained from the child feature nodes of the bottom-layer sub-networks.

As shown in FIG. 3, a sub-network functions to provide node selection operation between a parent feature and a child feature. The sub-network is the basic building block of the HCN 110. The sub-network, in the case of generation, is preferably mapped or networked from a higher-level feature to a set of lower level features, such that the lower level feature activity (e.g., visual features of an image) is determined by the activities of a higher level feature (e.g., object name). In the case of inference, the sub-network is preferably mapped or networked from lower level features to higher level features, such that the higher level feature activity (e.g., object name) is determined by the activities of a lower level feature (e.g., visual features of an image). The general architecture of a sub-network preferably includes a single top-level node that is a parent feature node. The parent feature node (PF1) preferably includes connections to multiple pool nodes (P1, P2, P3, P4) and weight nodes (W1, W2, W3, W4). Each pool node preferably includes connections to a plurality of child feature nodes (CF1, CF2, CF3, CF4, CF5, CF6, CF7, CF8, CF9, CFo) as well as the weight nodes (W1, W2, W3, W4). The weight nodes preferably connect to parent features corresponding to the same feature both in a given network and potentially across networks (alternatively stated, for a network that processes multiple images simultaneously, networks corresponding to a same feature but for different images). Alternatively, weight nodes may be shared (or not shared) in any manner. The instances of sub-networks within the HCN 110 may or may not share commonalities with other sub-networks. The functional operation of each node can vary in number and configuration of connections, connection weighting, and/or any other aspect. In some edge cases, a sub-network may not include only one node selection option. In one exemplary edge-case, the sub-network can be defined with no selection options so that activation of the parent-feature results in activation of the child feature. For example, the parent feature node may connect to one pool, and the one pool then connects to one CF node.

The nodes of the network preferably are configured to operate, perform or interact with probabilistic interactions that determine node activation, selection, ON/OFF, or other suitable states. When activated by a parent node, the node will preferably trigger activation of connected child nodes according to the selection function of the node. While a selection function may be any function, examples include logical AND, OR, and XOR selection functions (all Boolean), as well as tanh (and other sigmoid) selection functions. The nodes preferably represent binary random variables or multinomial random variables. As shown in FIG. 3, the HCN 110 may be modeled in Bayesian network form.

Figure 4A:
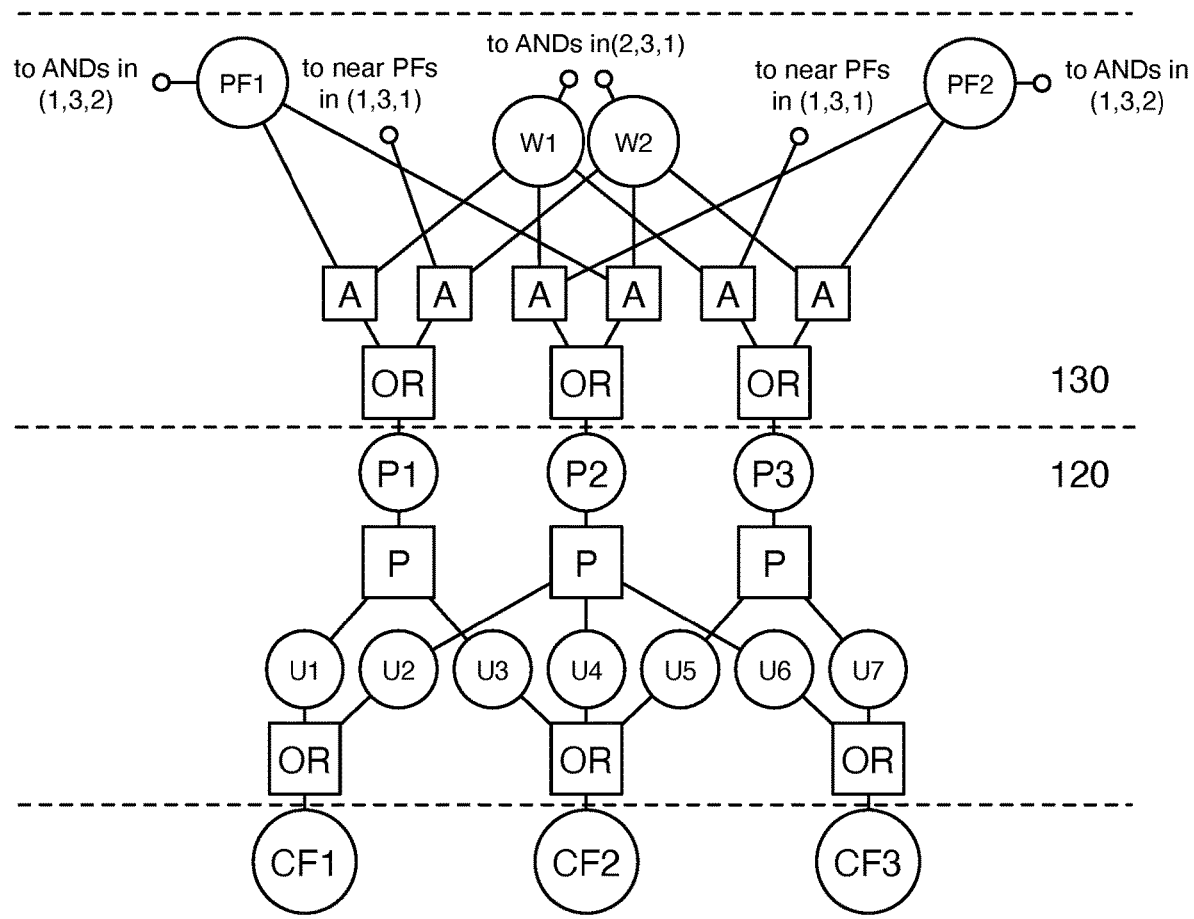
FIG. 4A is a factor graph representation of a section of a hierarchical compositional network of an invention embodiment.
Figure 4B:
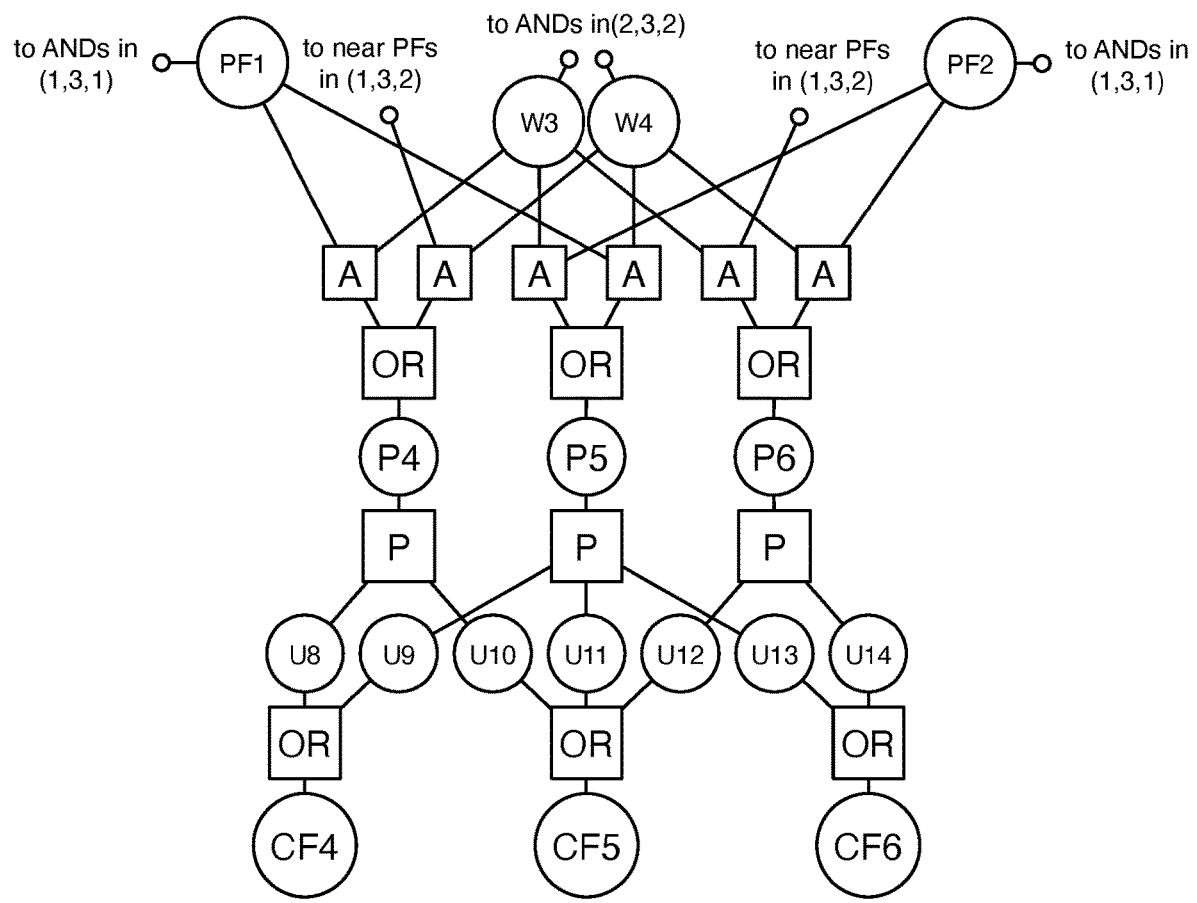
FIG. 4B is a factor graph representation of a section of a hierarchical compositional network of an invention embodiment.
Figure 4C:
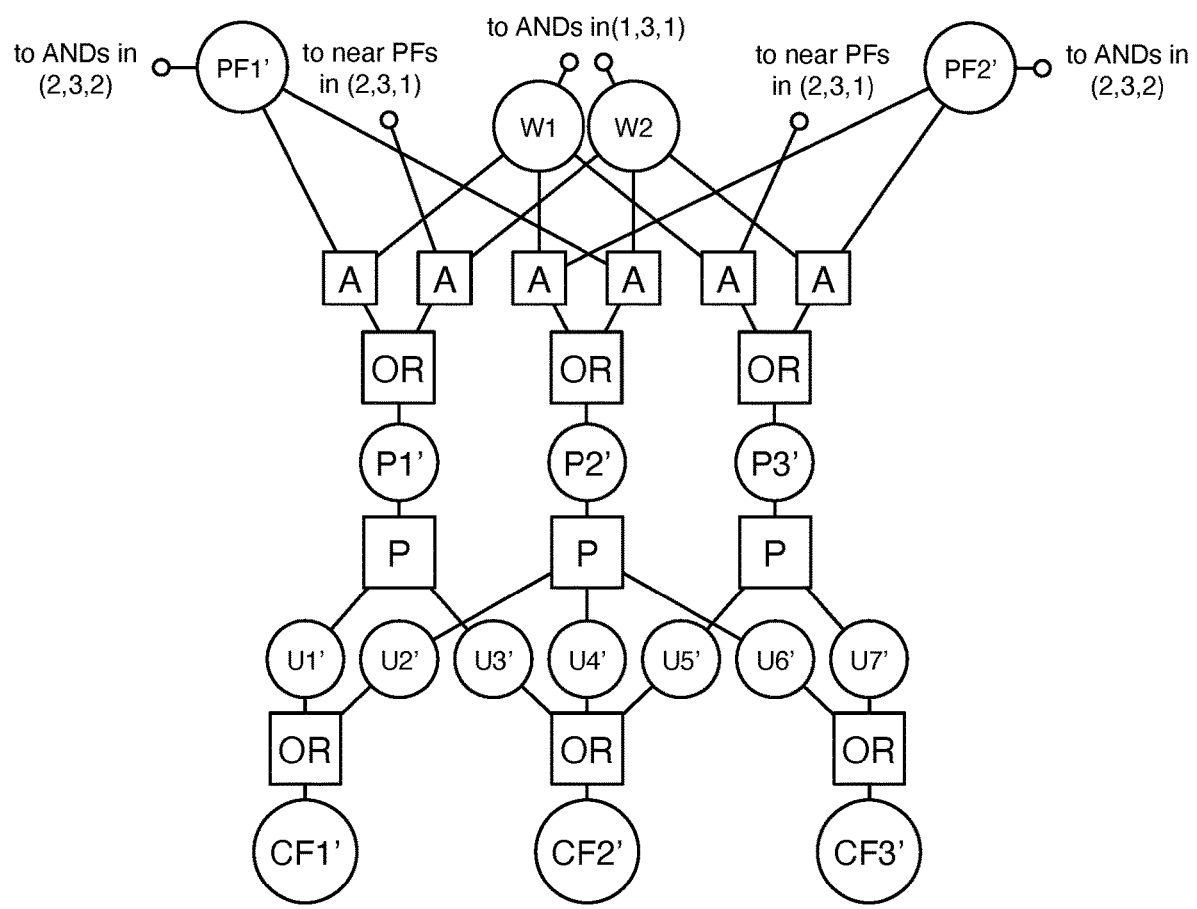
FIG. 4C is a factor graph representation of a section of a hierarchical compositional network of an invention embodiment.

In one implementation of an invention embodiment, the HCN 110 may be modeled in factor graph form using a set of binary random variable nodes and factor nodes, as shown in FIGS. 4A, 4B, and 4C. While the remainder of the description of the HCN 110 will be discussed with reference to the factor graph representation, it is understood to a person of ordinary skill in the art that the same HCN 110 may be equivalently represented by a Bayesian network or by any other suitable representation.

In this representation, the HCN 110 may be represented using binary random variable nodes (represented by circle symbols in FIGS. 4A, 4B, and 4C) and three types of factor nodes: AND factor nodes (represented by square A symbols in FIGS. 4A, 4B, and 4C), OR factor nodes (represented by square OR symbols in FIGS. 4A, 4B, and 4C), and POOL factor nodes (represented by square P symbols in FIGS. 4A, 4B, and 4C).

Figure 5A:
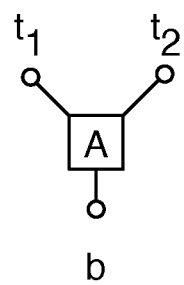
FIG. 5A is a factor graph representation of an AND factor node of a hierarchical compositional network of an invention embodiment.

The AND factor, as shown in FIG. 5A, preferably takes in two top variables ($t_1$, $t_2$) and one bottom variable (b). The AND factor preferably takes a first value (e.g., 0) when b is the logical AND of $t_1$ and $t_2$ and a second value (e.g., $-\infty$) otherwise. Alternatively, the AND factor may take in more than two top variables.

Figure 5B:
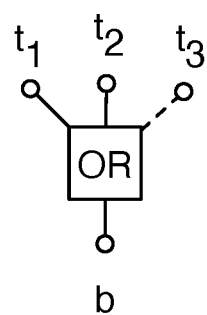
FIG. 5B is a factor graph representation of an OR factor node of a hierarchical compositional network of an invention embodiment.

The OR factor, as shown in FIG. 5B, takes in multiple top variables ($t_1$, $t_2$, . . . , $t_m$) and one bottom variable (b). The OR factor preferably takes a first value (e.g., 0) when b is the logical OR of $t_1$ . . . $t_m$ and a second value (e.g., $-\infty$) otherwise.

Figure 5C:
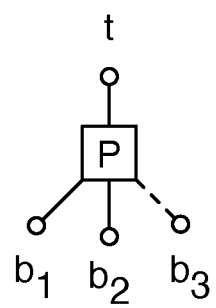
FIG. 5C is a factor graph representation of a POOL factor node of a hierarchical compositional network of an invention embodiment.

The POOL factor, as shown in FIG. 5C, takes in one top variable (t) and M bottom variables ($b_1$, $b_2$, . . . , $b_m$). The POOL factor preferably takes a first value (e.g., $-\log M$) when t=1 and exactly one of the bottom variables is 1 (referred to as an active pool), a second value (e.g., 0) when t=0 and all of the bottom variables are o (referred to as an inactive pool), and a third value (e.g., $-\infty$) otherwise.

These factor nodes, along with the previously mentioned binary random variable nodes, may be used to form the structure of the HCN 100.

The convolution layer 130 functions to combine a sparsification S with a set of weights W to produce a representation R. The weights can be thought of as a dictionary describing the elements of S in terms of the elements of R. For an HCN 110 operable on two-dimensional data (e.g., 2D image data), tensor S has size $H_s \times W_s \times F_s$ where the first two dimensions (height and width) are spatial, while the third dimension indexes the represented feature f. All of the elements of S with the same f produce the same expansion in R at different locations. As W contains the expansion at the representation layer of each feature, its size is $H_W \times W_W \times F_W \times F_W^{below}$ where $F_W = F_s$ and $F_W^{below} = F_R$. Tensor R in turn has size $H_R \times W_R \times F_R$. Probabilistically, R is a deterministic transformation of W and S given by: $p(R^\ell | S^\ell, W^\ell) = [R^\ell = \text{bconv}(S^\ell, W^\ell)]$ where the definition of the binary convolution is given as:

$$R_{:,:,f} = \min\left(1, \sum_f \text{conv2D}(S_{:,:,f}, W_{:,:,f,f_{below}})\right)$$

where conv2D is the usual 2D convolution operator. Thus, an element of R will be set to 1 if any of the elements of the sparsification S activates it once expanded according to W. From the definition of binary convolution previously stated, it can be shown that each element of R can be expressed by ORing a total of $H_w W_w F_w$ intermediate terms, with each intermediate term corresponding to the AND of a term from S and a term from W. Each intermediate term is used in exactly one OR and each element of R is connected to exactly one OR. However, the elements of W and S are connected to multiple ANDs.

As previously mentioned, the pooling layer 120 functions to introduce variability to the HCN 100. The pooling layer 120 accomplishes to shift the position of active units of representation R of a given layer ($R^\ell$), resulting in the sparsification layer below ($S^{\ell-1}$). Note that here 'position' refers to the correspondence of units of the HCN 100 to dimensionality of the input (e.g., a unit may correspond to a 9×9 region of neighboring pixels). Each pooling layer 120 preferably shifts the active units of R within a local pooling window of size $H_p \times W_p \times 1$; alternatively, the pooling layer 120 may shift active units of R in any manner.

When two or more active units in $R^\ell$ are shifted towards the same position in $S^{\ell-1}$, they result in a single activation, so the number of active units in $S^{\ell-1}$ is preferably equal to or smaller than the number of activations in $R^\ell$.

The shifting performed by the pooling layer may be expressed using a set of intermediate binary variables $U_{\Delta r, \Delta c, r, c, f}$ each of which are associated with a shift of $\Delta r$, $\Delta c$ of the element $R^\ell_{r,c,f}$, where this element corresponds to a given layer $\ell$, a position r,c, and a feature index f. The $H_p W_p$ intermediate variables associated to the same element $R^\ell_{r,c,f}$ are noted as $U_{:,:,rcf}$. Since an element can be shifted to a single position per realization when it is active, the elements in $U_{:,:,rcf}$ may be grouped into a pool $$\log p(U^\ell | R^\ell) = \sum_{rcf} \log p(U_{:,:,rcf} | R^\ell_{rcf}) = \sum_{rcf} \text{POOL}(U_{:,:,rcf} | R^\ell_{rcf})$$

and $S^{\ell-1}$ may be obtained from $U^\ell$ by ORing the $H_P W_P$ intermediate variables of U that can potentially turn it on:

$$\log p(S^{\ell-1} | U^\ell) = \sum_{r'c'f} \log p(S^{\ell-1}_{r'c'f} | U^\ell) = \sum_{rcf} \text{OR}(S^{\ell-1}_{r'c'f} | \{U_{\Delta r, \Delta c, r, c, f}\}_{r': r+\Delta r, c': c+\Delta c})$$

Note that as described in the previous paragraphs, the pooling layers are shifted 'spatially' only (i.e., across input dimensions). Additionally or alternatively, pooling layers may also shift across features, which may introduce richer variance in features.

As shown in FIGS. 4A and 4B, sections of an HCN 110 present on a given convolution layer 130 and pooling layer 120 (in this example, together referred to as layer 3) may be represented using the previously mentioned factor nodes and several sets of variable nodes: a set of feature variable nodes (represented by circle PF symbols), and a set of weight variable nodes (represented by circle W symbols), a set of pool variable nodes (represented by circle P symbols), and a set of intermediate variable nodes (represented by circle U symbols). The sections as shown in FIGS. 4A and 4B provide an example of how feature nodes (PF) may couple to lower level feature nodes (CF) both across a given input dimension region (as exemplified by the connections explicitly shown in FIG. 4A and FIG. 4B) as well as across features (e.g., as shown in the implicit connections in FIG. 4A that link to the structure in FIG. 4B and vice versa). Note that, in the example as shown in FIGS. 4A and 4B, PF1 and PF2 are connected to CF nodes corresponding to FEATURE 1 (seen in FIG. 4A) as well as to CF nodes corresponding to FEATURE 2 (seen in FIG. 4B).

The sections as shown in FIGS. 4A and 4C provide an example of how weight variable nodes (W) may be shared across different HCNs 100 for nodes corresponding to the same layer and feature (note that 'different HCN' here refers to structurally similar networks intended to process the same kind of data, potentially simultaneously; alternatively, these may be referred to as subnetworks or subsections of a larger HCN 100). As discussed in more detail in later sections, this enables training of an HCN 100 on multiple datasets simultaneously.

Figure 6:
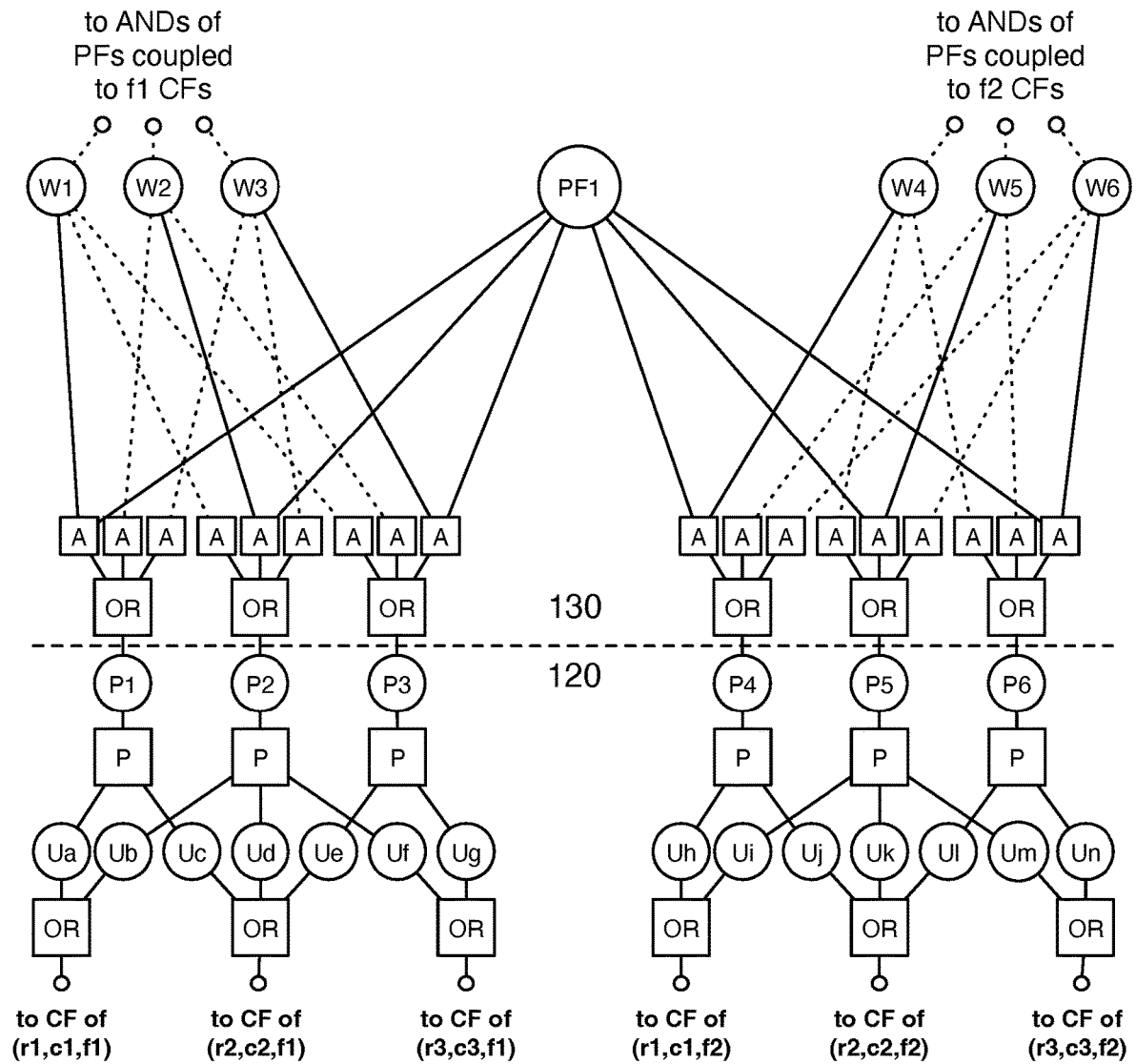
FIG. 6 is a factor graph representation of a subnetwork of a hierarchical compositional network of an invention embodiment.

The example network sections as shown in FIGS. 4A-4C include parts of multiple subnetworks. As shown in FIG. 6, a first example of a subnetwork of an HCN 100 includes a feature variable node (represented by a circle PF symbol), and a set of weight variable nodes (represented by circle W symbols), a set of pool variable nodes (represented by circle P symbols), and a set of intermediate variable nodes (represented by circle U symbols). In this first example, the feature variable node (PF1) is preferably coupled to higher level subnetworks (e.g., the OR factor nodes of a pooling layer 120) above (i.e., the output of the feature variable node in inference/forward message passing and the input of the feature variable node in generation/backward message passing). Below (i.e., the input of the feature variable node in inference/forward message passing and the output of the feature variable node in generation/backward message passing), PF1 is preferably connected to one or more AND factor nodes, which in turn are preferably connected to OR factor nodes (these nodes together making up part of a convolution layer 130). In turn, these OR factor nodes are preferably coupled are preferably coupled to pool variable nodes, which are in turn coupled to POOL factor nodes, which are in turn connected to intermediate variable nodes, which are in turn connected to OR factor nodes, which finally connect to feature variable nodes of a lower layer.

As shown in FIG. 6, this example subnetwork maintains connections to child feature variable nodes across multiple positions (e.g., child features associated with positions r1,c1; r2,c2; and r3,c3) as well as child feature variable nodes across multiple feature indexes (e.g., child features associated with f1 and f2). While the subnetwork as shown in FIG. 6 is bounded to include a single feature variable node at one level and no feature variable nodes at other levels, a person of ordinary skill in the art will recognize that the boundary conditions used to define a subnetwork of a given HCN 100 may be chosen in any manner (e.g., a subnetwork may include both parent feature variable nodes and child feature variable nodes). Note also that sub-networks may be overlapping; for example, the pool variable nodes of the example subnetwork may also be coupled to multiple OR factor nodes (corresponding to parent feature variable nodes of differing feature indexes).

Note that in the example subnetwork, PF1 is connected to multiple CF nodes corresponding to a given feature index. A feature node of a given layer is preferably connected to all feature nodes within some region of the feature node; e.g., if the feature node is associated with a position (r1, c1), the feature node may be connected to all feature nodes in the layer below corresponding to all (r, c) that satisfy $|r_1-r|<Z_1$, $|c_1-c|<Z_2$ where the region defined by $Z_1$ and $Z_2$ is referred to as a receptive field.

The receptive field may be set in any manner and may vary based on position, layer, or any other function of the HCN 100. For example, feature variable nodes of higher layers may have a smaller receptive field than those of lower layers. As another example, feature variable nodes corresponding to a given layer and a position relatively central to the network input dimensions may have larger receptive fields than those in the same layer but at the periphery of the network input dimensions.

Likewise, the overlap between receptive fields may be varied. The receptive field and overlap in turn may correspond to the difference in number of feature nodes in two connecting layers; for example, if a first layer has a feature node for each position in a 2D array of size 4×4 (16 nodes) and the receptive field for the layer above is 2×2 with no overlap, the above layer will contain 4 feature nodes. In the case of 50% overlap (e.g., the receptive window shifts by one instead of by two), the above layer instead contains 9 feature nodes. Similar to the receptive field, overlap may be varied based on position, layer, or any other function of the HCN 100.

Figure 7:
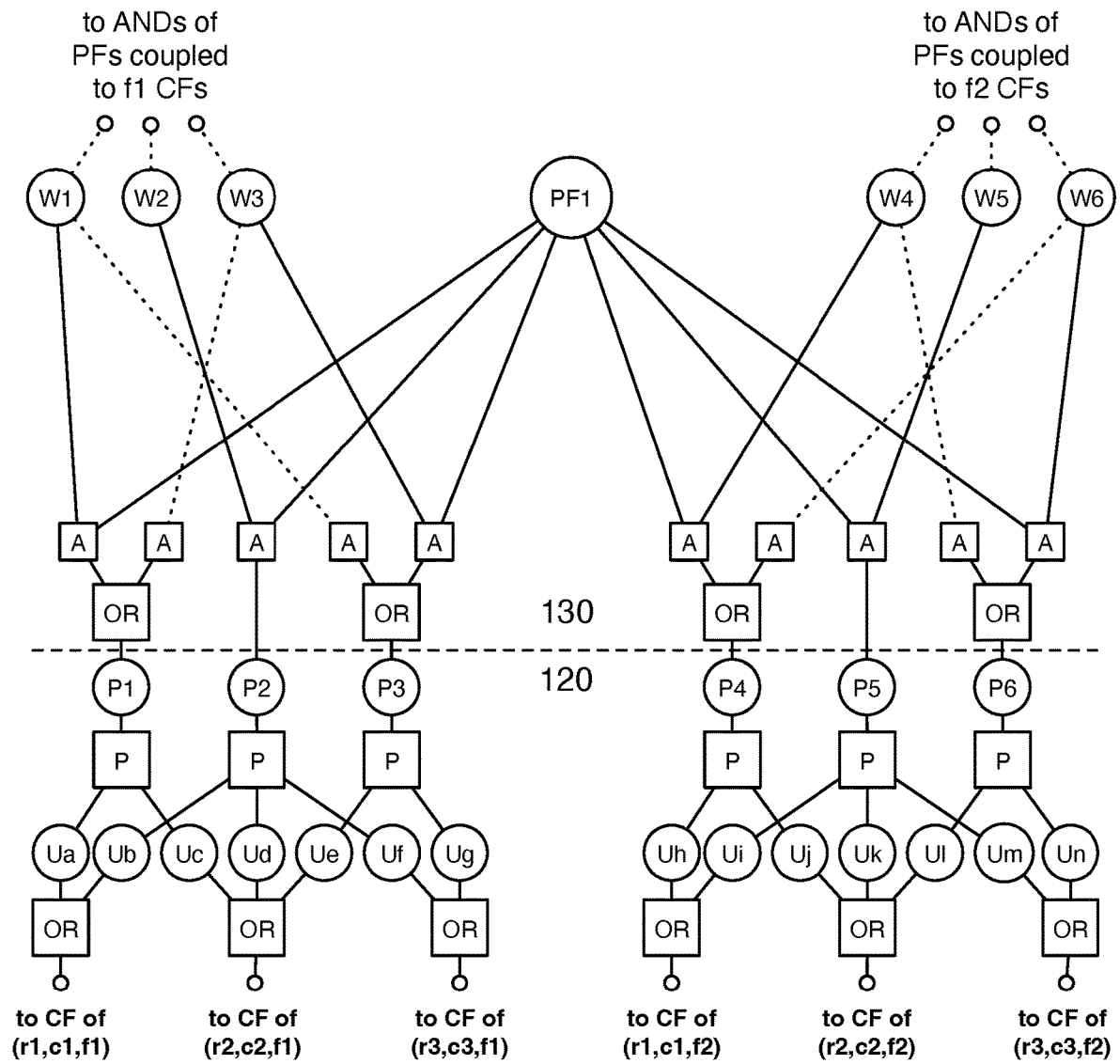
FIG. 7 is a factor graph representation of a subnetwork of a hierarchical compositional network of an invention embodiment.

In the example subnetwork of FIG. 6, PF1 has a receptive field of 3 and 66% overlap. A second example subnetwork featuring a receptive field of 3 and an overlap of 33% is as shown in FIG. 7.

Given the above explanation of the general functioning and structure of the HCN 100, the following sections will discuss the elements in more detail.

The feature variable nodes function to identify individual features, which are which are in turn composed of lower-level features (i.e., child features) and may themselves serve in describing higher-level features (i.e., parent features). In other words, a feature variable node in a first layer may serve as a parent feature to nodes in layers below the first layer and as a child feature to nodes in layers above the first layer. As shown in FIG. 4A, the feature variable nodes at the top are labeled as parent feature nodes (PF) to distinguish from the feature variable nodes of a lower layer, labeled as child feature node (CF); however, a person of ordinary skill in the art will recognize that a given feature node may serve as either or both of a parent feature node or a child feature node. The feature variable nodes are preferably specific to a given subnetwork (i.e., each distinct subnetwork in a given convolution layer 130 has a distinct parent feature variable node); alternatively, subnetworks may include multiple parent feature variable nodes and/or may share parent feature variable nodes.

The feature variable nodes function to identify individual features, which are which are in turn composed of lower-level features (i.e., child features) and may themselves serve in describing higher-level features (i.e., parent features). In other words, a feature variable node in a first layer may serve as a parent feature to nodes in layers below the first layer and as a child feature to nodes in layers above the first layer. As shown in FIG. 4A, the feature variable nodes at the top are labeled as parent feature nodes (PF) to distinguish from the feature variable nodes of a lower layer, labeled as child feature node (CF); however, a person of ordinary skill in the art will recognize that a given feature node may serve as either or both of a parent feature node or a child feature node.

The feature variable nodes of the HCN 100 are preferably connected to a pooling layer 120 above (i.e., the output of the feature variable node in inference/forward message passing and the input of the feature variable node in generation/backward message passing). Below (i.e., the input of the feature variable node in inference/forward message passing and the output of the feature variable node in generation/backward message passing), the feature variable nodes are preferably connected to one or more AND factor nodes.

As shown in FIGS. 4A-4C, 6, and 7, the AND factor nodes below the feature variable nodes couple both the feature variable nodes and weight variable nodes (above the AND factor node) to pool variable nodes (preferably through an OR factor node, but alternatively directly).

Figure 8:
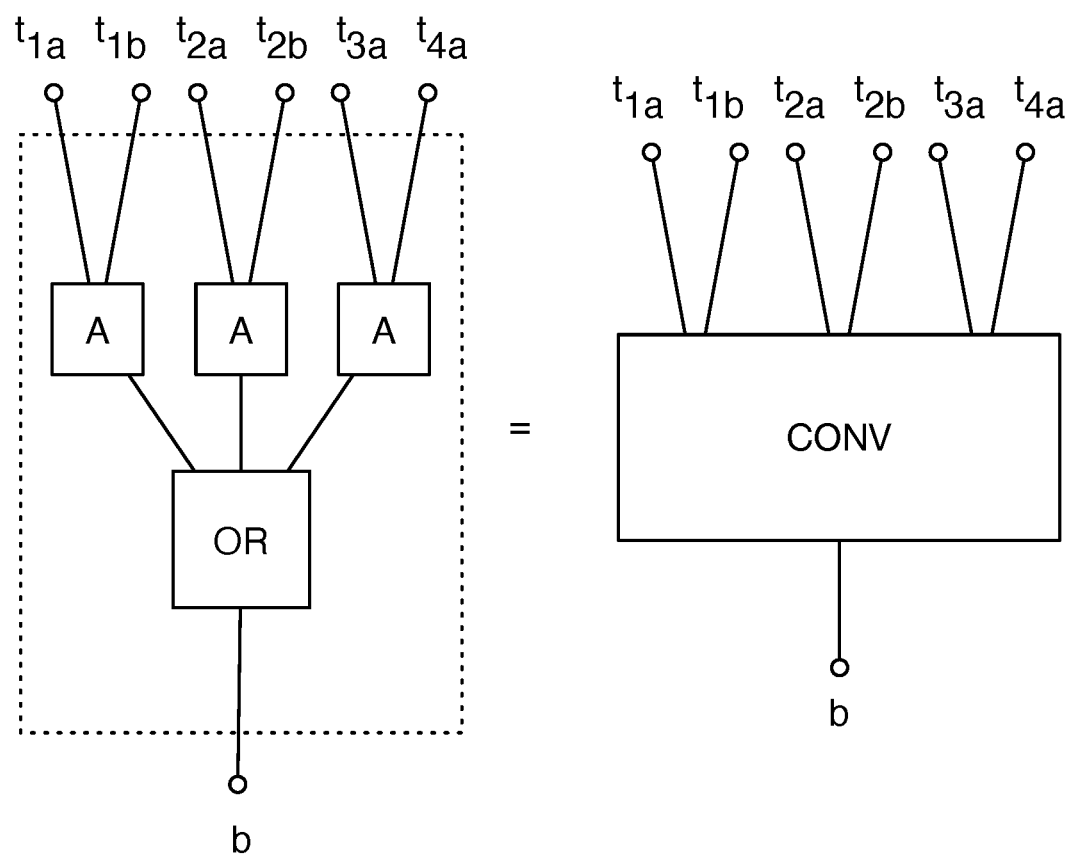
FIG. 8 is a factor graph representation of a CONV factor node of a hierarchical compositional network of an invention embodiment.

Note that while the AND and OR factor nodes are represented in FIGS. 4A-4C, 6, and 7 as distinct factor nodes, a person of ordinary skill in the art will recognize that this is a representation of convenience and that the factor nodes may be combined into an equivalent single factor node (hereafter referred to as a convolution factor node, CONV) as shown in FIG. 8. The CONV factor preferably takes in multiple pairs (or multiple sets of size greater than 2) of top variables $\{t_{1a}, t_{1b}, t_{2a}, t_{2b}; \ldots; t_{ma}, t_{mb}\}$ and one bottom variable (b). The CONV factor preferably takes a first value (e.g., 0) when b is the logical OR of ($t_{1a}$ AND $t_{1b}$) . . . ($t_{ma}$ AND $t_{mb}$) and a second value (e.g., $-\infty$) otherwise.

The AND factor nodes function to enable the selective activation of connections between parent feature variable nodes and child variable nodes based on the weight variable nodes. The OR factor nodes coupled to the AND factor nodes (alternatively stated, the CONV factor nodes) in turn function to enable neighboring parent feature variable nodes to couple to pooling layers in a manner such that active units shifted toward the same position result in a single activation (preventing unnecessarily many activations) as discussed in the section on the convolution layer 130.

Along with the AND factor nodes, the weight variable nodes function to enable the selective activation of connections between parent feature variable nodes and child variable nodes. Stated alternatively, the connection between a feature variable node and a pool variable node (which in turn couples to child variable nodes) may be disabled or enabled based on the weight variable node. The use of weight variable nodes is a unique part of the HCN 100; they enable the HCN 100 to learn not only network parameters but also (in a sense) network structure. This functionality is not possible in traditional neural networks.

Weight variable nodes are unique among the variable nodes of the HCN 100 in that their role and function may change depending on the training state of the network; that is, weight variable nodes preferably function differently during primary training than after it.

As shown in FIGS. 4A and 4C, during training, weight variable nodes are preferably connected across HCNs 100 (alternatively stated, for an HCN 100 that processes multiple input datasets simultaneously, sub-networks corresponding to a same feature but for a different input dataset). This enables the weight variable nodes to receive and send update messages based on multiple inputs; e.g., the weights may be trained based on multiple training set elements (such as images) simultaneously. Alternatively, the weight variable nodes may only be connected to a single HCN 100 (and training may occur on training set elements in series rather than in parallel).

In one variation of an invention embodiment, the weight variable nodes are coupled to message storage. In this variation, the weight variable nodes may remember messages passed to them during one part of training (e.g., a first element of a training set) and provide message updates based on the remembered messages in future parts of training. For example, the output of weight variable nodes during training on one training element (or a set of training elements) may be based on stored messages received during training on previous training elements.

Through use of memory and/or connections to multiple HCNs 100, weight variable nodes may enable purely batch training (looking at many training set elements at a time), purely online learning (looking at a single training set element at a time), or any combination of the above (e.g., weight variable nodes may train on multiple sets of five images, each set after another). This may enable ideal use of computational resources.

After training, weight variable nodes (if previously coupled to multiple HCNs 100) are preferably de-coupled (i.e., fixed to a single HCN 100) and fixed in value. Together with the AND nodes, this is functionally equivalent to activating or de-activating network connections. For example, the connections of the HCN 100 shown in FIG. 9A may be functionally represented by the connections of FIG. 9B. Alternatively, weight variable nodes may remain variable and/or may maintain connections across networks.

To take advantage of the dimensionality of input data, weight variable nodes are preferably shared across connections of feature variable nodes corresponding to the same feature and relative location.

Figure 10:
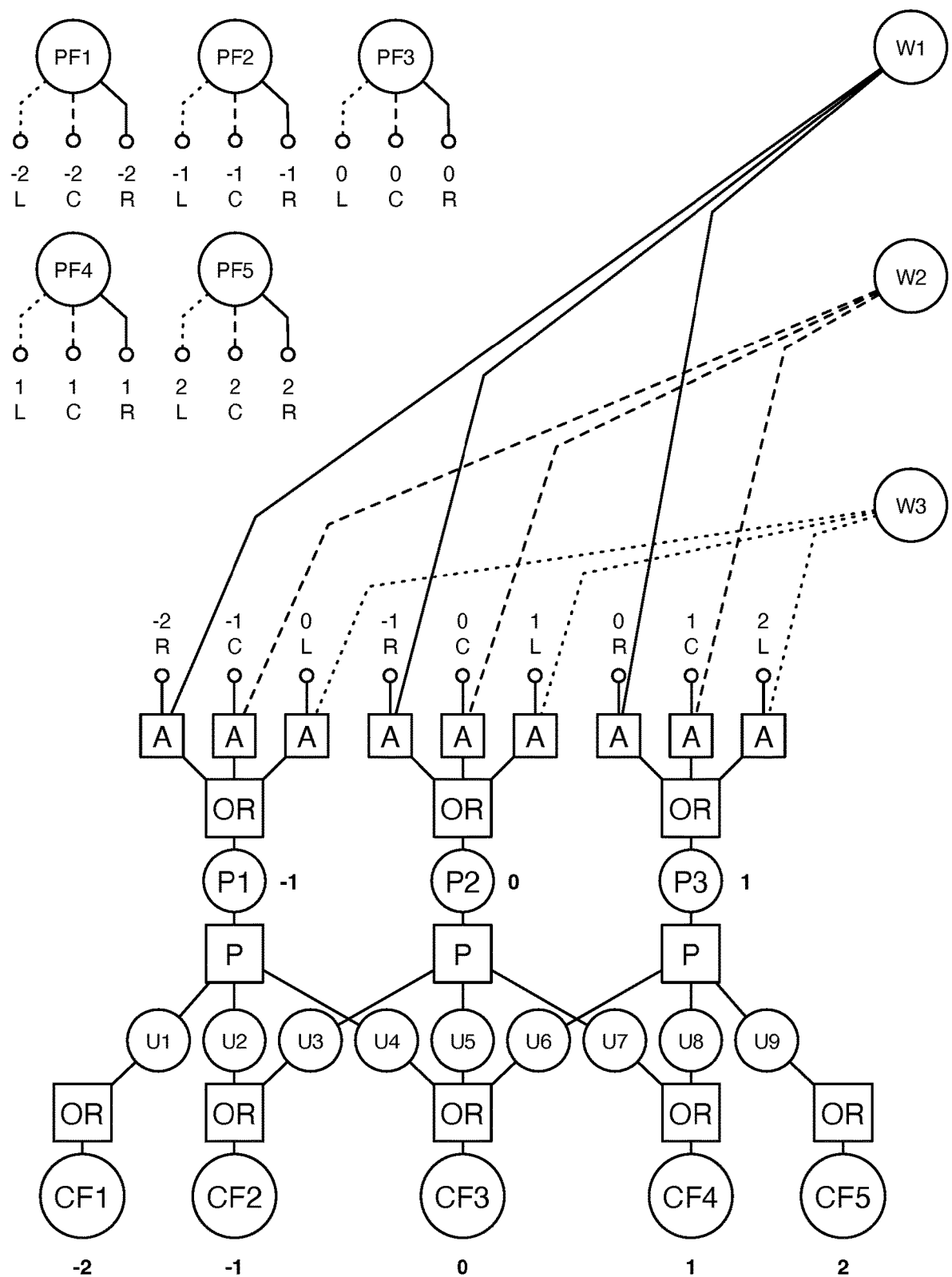
FIG. 10 is a factor graph representation of a section of a hierarchical compositional network of an invention embodiment.

For example, as shown in FIG. 10, a section of an HCN 100 includes five parent feature variable nodes and five child feature variable nodes. In this example, each feature variable node is associated with a position (e.g., −2, −1, 0, 1, 2) as is each pool variable node (e.g., −1, 0, 1). Note that each parent feature variable node is coupled to three pool variable nodes (via AND and OR factor nodes); one at (x−1), one at (x), and one at (x+1), (where (x) is the position associated with the parent feature variable node). This has been represented in FIG. 10 as L/C/R (left/center/right) connections respectively. As shown in FIG. 10, W1 corresponds to each 'R' connection, W2 corresponds to each 'C' connection, and W3 corresponds to each 'L' connection.

Alternatively, weight variable nodes may not be shared across only some or none of feature node connections associated with the same feature and relative location.

Together, the feature variable nodes, weight variable nodes, and AND/OR factor nodes comprise a representation of the convolution layer 130. Below and/or above the convolution layer 130, the convolution layer 130 is coupled to one or more pooling layers 120. As shown in FIG. 6, at the subnetwork level, this connection is represented by the connection between OR factor nodes and pool variable nodes.

The pool variable nodes function as transformation-invariant (e.g., translation invariant across a discrete set of translations, transformation across feature indexes) representations of child feature variable nodes. Each pool variable node is coupled to a POOL factor node, which in turn couples to (via intermediate variable nodes and OR factor nodes) child feature variable nodes.

Each pool variable node is preferably associated with a position (or other index of input dimension) and a feature index (though in some variations, pool variable nodes may POOL across features; in this case, pool variable nodes may be represented by a composite feature index or multiple feature indexes).

Figure 11:
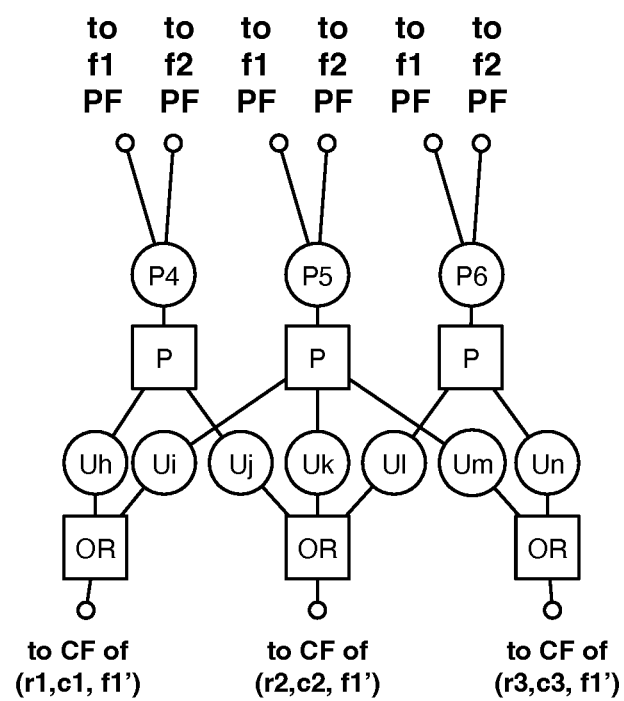
FIG. 11 is a factor graph representation of a section of a hierarchical compositional network of an invention embodiment.

Pool variable nodes preferably couple to parent feature variable nodes of multiple (e.g., all) feature indexes of the layer above. In the example as shown in FIG. 11, P4, P5, and P6 are associated with a particular feature index of the child feature variable nodes below. While pool variable nodes preferably couple to convolution layer 130 OR factor nodes of every feature index in the layer above, pool variable nodes may alternatively couple only to a subset of convolution layer 130 OR factor nodes.

Figure 12:
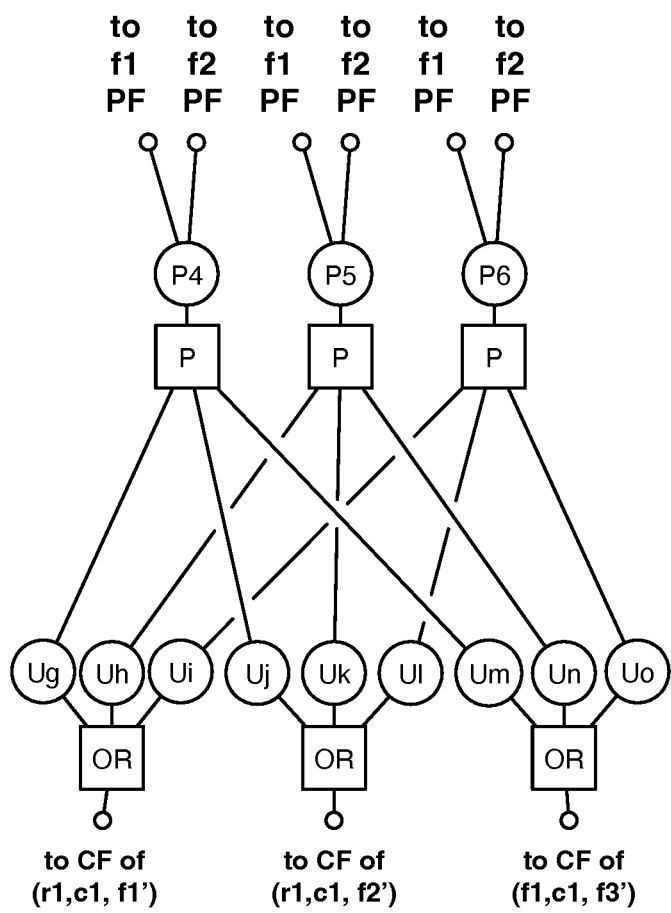
FIG. 12 is a factor graph representation of a section of a hierarchical compositional network of an invention embodiment.

Each pool variable node couples to a POOL factor node below, which in turn couples to several intermediate variable nodes below, which in turn are connected via OR factor nodes to a feature variable node. This structure enables the introduction of variability to HCN 100 generation. The POOL factor node, for a given pool variable node, enables the selection of a child feature variable node with a shift (noting that this shift may be across either data dimensions and/or feature index, and noting also that the shift may be zero). For example, as shown in FIG. 12, POOL factor nodes may additionally or alternatively enable shifting across feature index.

Each OR factor node preferably couples to a single child feature variable node below; thus, each OR factor node is preferably associated with a dimension index (e.g., a position) and feature index (the dimension index and feature index of the child feature variable node). Likewise, the set of intermediate variable nodes coupled to each OR factor node represent a pool also corresponding to this dimension and feature index.

For example, as shown in FIG. 10, an example pool coupled to a child feature variable node with dimension index o includes intermediate variable nodes U4, U5, and U6. These intermediate variable nodes are in turn coupled to different pool variable nodes; for example, U4 is connected (via a POOL factor node) to P1, which has a dimension index of −1 while U5 is connected to P2, which has a dimension index of 0.

The number of intermediate variable nodes is related to the aforementioned pooling window associated with a pool (and/or a pool variable node). For example, as shown in FIG. 10, each of the pool variable nodes (P1, P2, P3) is coupled to a pooling window of size 3 (e.g., P1, associated with position -1, couples to intermediate variables associated with child feature positions of −2, −1, and 0, representing shifts of −1, 0, and 1 respectively).

The pooling window may be set in any manner and may vary based on position, layer, or any other function of the HCN 100. For example, pool variable nodes of higher layers may have a smaller pooling window than those of lower layers. As another example, pool variable nodes corresponding to a given layer and a position relatively central to the network input dimensions may have larger pooling windows than those in the same layer but at the periphery of the network input dimensions. Likewise, the overlap between pooling windows may be varied (e.g., similar to receptive fields).

Figure 13:
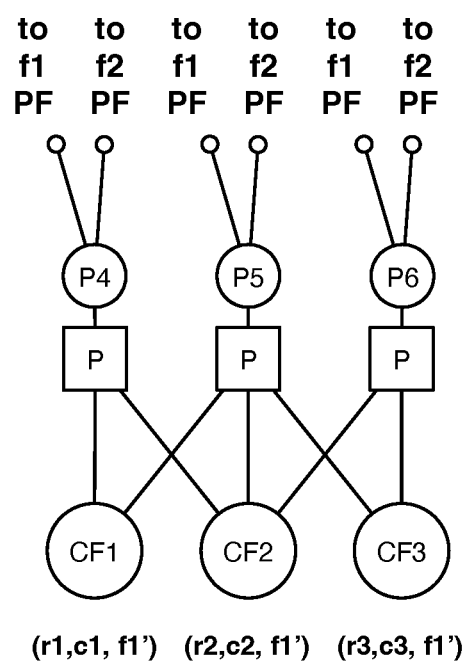
FIG. 13 is a factor graph representation of a section of a hierarchical compositional network of an invention embodiment.

The intermediate variable nodes and OR factor nodes function to prevent multiple activations when two or more active units in the layer above are shifted toward the first position. While the pooling layer 120 preferably includes these nodes, in a variation of an invention embodiment, the POOL factor node may connect directly to child feature variable nodes, as shown in FIG. 13.

Figure 14:
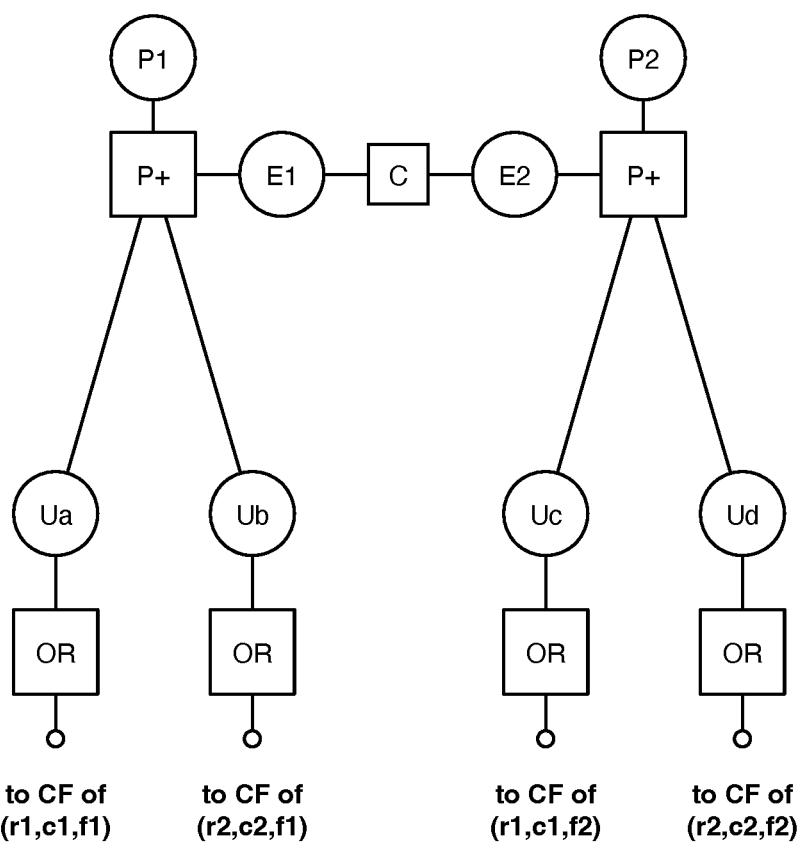
FIG. 14 is a factor graph representation of a section of a hierarchical compositional network of an invention embodiment.

In a variation of an invention embodiment, the pooling layer 120 may additionally include lateral constraint factor nodes, as shown in FIG. 14. Constraint factor nodes function to restrict the kinds of patterns that are allowed in the sub-network. The constraint factor nodes (represented as 'C') are preferably coupled to modified POOL factor nodes (represented as 'P+') via extended state variable nodes (E1, E2 . . . ).

The modified POOL factor nodes are preferably substantially similar to previously described POOL factor nodes, except that when the extended state variable node does not correctly represent the state of the pool, the POOL factor node is forced to a particular value (e.g., −∞). Note that the extended state variable node is preferably a multinomial representative of the state of the pool; i.e., which intermediate variables are active and which are not. The constraint factor node preferably enforces a desired correlation between extended state variable nodes of different pools (e.g., if Ua of P1 is active, so then must Uc of P2 be active). Constraint factor nodes can enforce restrictions, rules, and constraints within selection of nodes in other pools, in other sub-networks, and/or in different times. The HCN 100 is preferably evaluated in an ordered fashion such that nodes that are connected through a constraint factor node are preferably not evaluated simultaneously. Subsequently, restrictions of the constraint variable node are activated/enforced on other connected (i.e., constrained) nodes.

In addition to pooling layers 120 and convolutional layers 130 and their elements as mentioned above, the HCN 100 may also include a pre-processing layer 110 and/or a class layer 140.

The pre-processing layer no functions to process input data to prepare it for use by the HCN 100 (and thus may be considered the lowest level of the HCN 100). Examples of pre-processing that may be performed by the pre-processing layer 110 may include edge detection, resolution reduction, contrast enhancement; pitch detection, frequency analysis, or mel-frequency cepstral coefficient generation. Additionally or alternatively, the pre-processing layer no may perform any transformation or processing on input data. In one example implementation, the pre-processing layer is a noisy channel layer operating on individual pixels of input image data. This noisy channel may generate a bottommost sparsification $S_0$ from an input image X using bit flip probabilities of $p(X_{ref}=1|S_{ref}^0=0)=P_{10}$; $p(X_{ref}=0|S_{ref}^0=1)=P_{01}$.

The class layer 140, in contrast to the pre-processing layer no, serves as the highest layer of the HCN 100. The class layer 140 functions to select classification categories and templates. For example, an HCN may contain several categories, one associated with 'furniture'. The 'furniture' category may in turn contain several different representations of furniture; e.g., a chair, a table, etc. The category/template structure represents a two-level classification strategy; however, the class layer 140 may include a classification strategy incorporating any number of levels.

Figure 15:
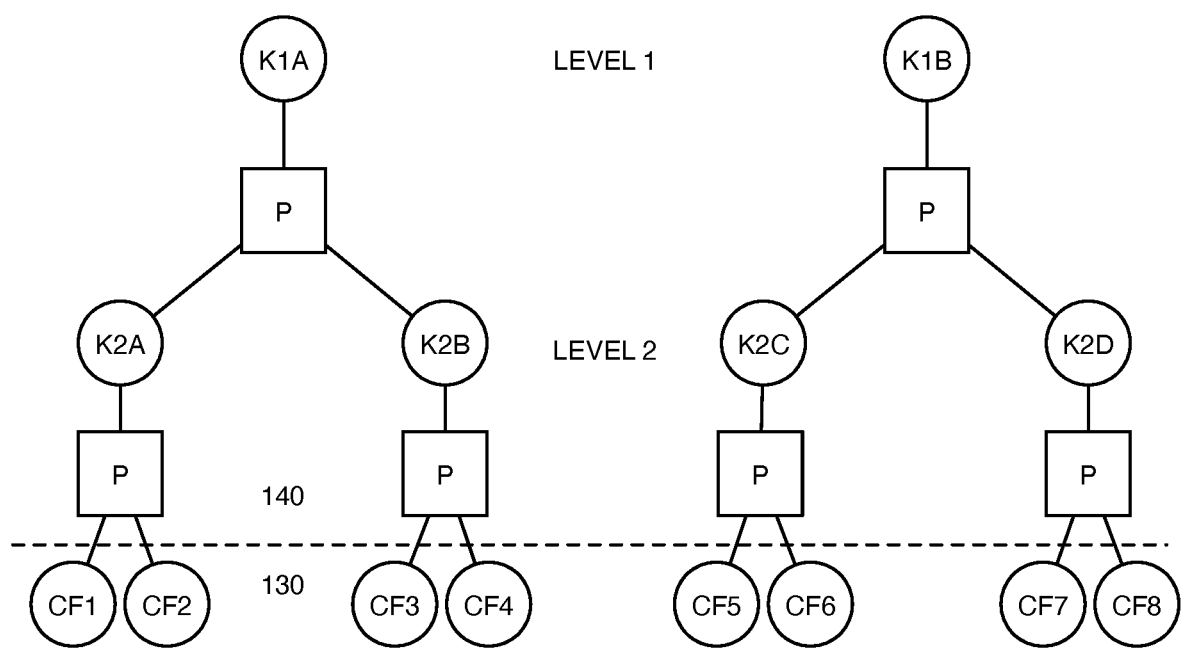
FIG. 15 is a factor graph representation of a section of a hierarchical compositional network of an invention embodiment.

The class layer 140 preferably includes at least one set of classification variable nodes, as shown (represented by circle K symbols) in FIG. 15. These classification variable nodes are preferably coupled to high-level feature variable nodes (e.g., CF1 . . . ) or other classification variable nodes via a POOL factor node, which enforces that when a classification variable node is selected, only one of the elements below (e.g., a lower level classification variable node or a feature variable node) is selected at a time. Additionally or alternatively, classification variable nodes may be coupled by any factor node (e.g., OR factor node) enabling selection of classes (e.g., categories, templates, etc.).

3. HCN Learning

Figure 16:
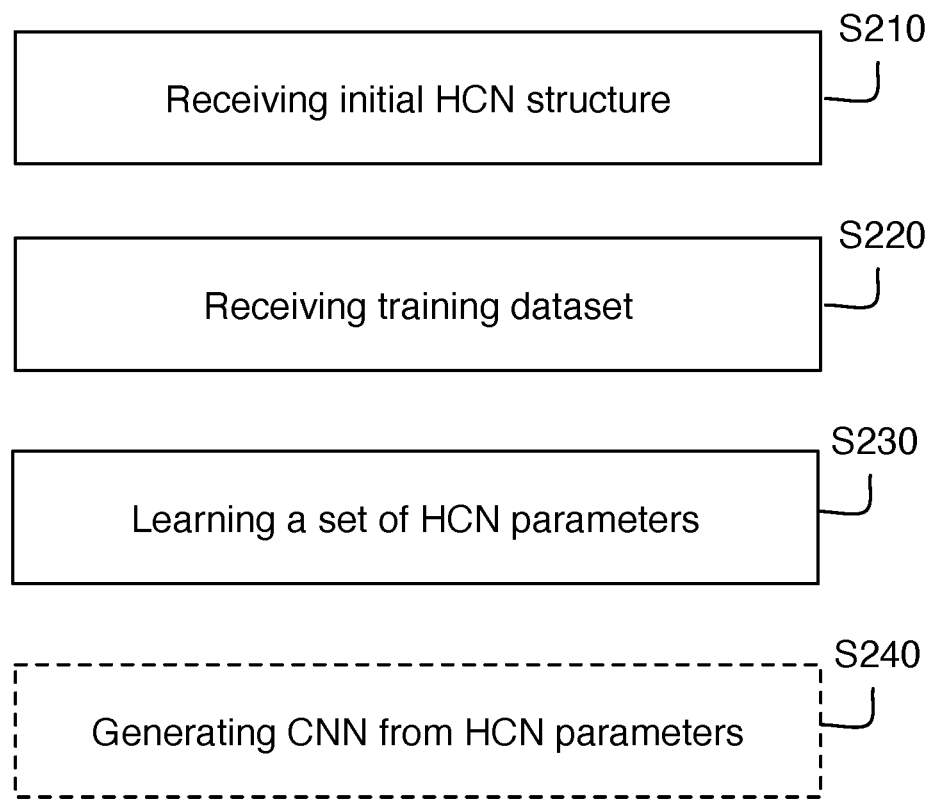
FIG. 16 is a chart representation of a method of an invention embodiment.

A method 200 for learning a hierarchical compositional network (HCN) includes receiving an initial HCN structure S210, receiving a training dataset S220, and learning a set of HCN parameters S230, as shown in FIG. 16. The method 200 may additionally include generating a convolutional neural network (CNN) based on the set of HCN parameters S240.

The method 200 functions to set tunable parameters of an HCN such that the HCN is trained to perform data inference (and/or generation) based on a set of data used to train the HCN (i.e., the training dataset received in S220).

The method 200, taking advantage of the unique structure of HCNs, may be performed in both unsupervised and supervised settings, as well as with either of complete and incomplete datasets. Further, in some implementations of the method 200, the method may be used to learn classifiers with the functional form of a CNN (and even generate such a network, as in S240).

The method 200 is preferably implemented on the HCN 100, but may additionally or alternatively be implemented by any neural network capable of implementing the steps of the method 200. The method 200 is preferably implemented by a computing system (e.g., computer, distributed computing system, etc.).

S210 includes receiving an initial HCN structure. S210 preferably includes receiving information describing the structure of an HCN—e.g., data that specifies the neurons of the HCN and their connections. This information may be specified in a number of forms; for example, HCN structure may be specified by specifying each variable node and factor node and their connections. Alternatively, HCN structure may be specified relying on known structural rules (e.g., a two-layer HCN, each layer containing a convolutional sub-layer and a pooling sub-layer, connections specified by stated pooling windows and receptive fields). HCN structure information may include any HCN structural or parametric information described in the section on the HCN 100 as well as any additional information that may be used in the course of the method 200.

S210 may additionally include receiving hyperparameters of the HCN 100; e.g., bit-flip probabilities for input data (e.g., $P_{01}$, $P_{10}$). As a second example, S210 may include receiving fixed per-layer sparse priors for weight variable nodes (represented as $\pi^\ell$). Additionally or alternatively, S210 may include receiving any other hyperparameters or parameters related to the HCN.

S220 includes receiving a training dataset. S220 functions to receive a set of training data (henceforth referred to as X). The set of training data preferably includes multiple elements (e.g., $\{X_n\}_{n=1}^N$); for example, each element may correspond to a different training image of an image dataset. Training data may additionally include corresponding classifying information; for example, a dataset may include a set of labels C: $\{X_n, C_n\}_{n=1}^N$.

Accordingly, training data may be unlabeled, partially labeled, or fully labeled. Likewise, training data may be complete (e.g., information is provided for each input neuron of the HCN) or incomplete (e.g., information is not provided for all input neurons).

Training data may be any set of data for which inference or generation is desired; e.g., images, video, audio, speech, medical sensor data, natural language data, financial data, application data, traffic data, environmental data, etc.

S230 includes learning a set of HCN parameters. S230 functions to learn values for tunable parameters of the HCN based on the training dataset (allowing the HCN to perform inference or generation for data objects similar to those the HCN is trained on). These tunable parameters are preferably chosen by attempting to maximize the network's likelihood given the training set data by varying the parameters of the HCN iteratively (until HCN parameters corresponding to a maximum likelihood value are found).

HCN parameters learned in S230 preferably include values for the HCN weight variable nodes (which may be used to modify the structure of the HCN; this is described in more detail in later sections), but may additionally or alternatively include any other HCN parameters (e.g., constraint variable node values, connection weights, etc.).

In one example, the joint probability of multiple training set elements is given by $$\log p(\{X_n, H_n, C_n\}_{n=1}^N, \{W^\ell\}_{\ell=1}^L) =$$

$$\sum_{\ell=1}^L \log p(W_n^\ell) + \sum_{n=1}^N \log p(X_n \mid S_n^0) + \log p(S_n^L \mid C_n) + \log p(C_n) +$$

$$\sum_{n=1}^N \sum_{\ell=1}^L \log p(S_n^{\ell-1} \mid U_n^\ell) + \log p(U_n^\ell \mid R_n^\ell) + \log p(R_n^\ell \mid S_n^\ell, W^\ell)$$

where $H_n$ is a collection of the latent variables corresponding to the nth element. In this example, S230 may include attempting selecting W to maximize this joint probability. Note that this is distinct from selecting W by maximizing a discriminative loss of the type $\log p(\{C_n\}_{n=1}^N \mid \{X_n\}_{n=1}^N, \{W^\ell\}_{\ell=1}^L)$; in this case, all the prior information p(X) about the structure of the images is lost, resulting in more samples being required to achieve the same performance (and less invariance to new test data).

S230 preferably includes performing HCN learning using a max-product message passing algorithm in multiple (forward and backward pass) iterations. Alternatively, S230 may include performing HCN learning using any type of message passing.

In a first example, S230 includes performing network initialization by initializing bottom-up messages with the logarithm of samples from a uniform distribution in (0,1|, initializing top-down messages to −∞, and setting constant bottom-up messages to $S_0$: $m(S_{rcf}^0) = (k_1 - k_0) X_{rcf} + k_0$ with $$k_1 = \log \frac{1 - P_{01}}{P_{10}} \text{ and } k_0 = \log \frac{P_{01}}{1 - P_{10}}.$$

In this example, after initialization, S230 repeats the following:

For each $\ell$ from 1, . . . , L (forward pass)

update messages from OR to $U^\ell$ in parallel update messages from POOL to $R^\ell$ in parallel with damping λ=0.5 update messages from CONV to $W^\ell$ in parallel with damping λ=0.5 update messages from CONV to $S^\ell$ in parallel with damping λ=0.5 update message from all class layer POOLs to $S^L$ and hard assign $C_n$ if label available For each $\ell$ from L, . . . . ,1 (backward pass)

update messages from CONV to $W^\ell$ in parallel update messages from CONV to $R^\ell$ in parallel update messages from OR to $U^\ell$ in parallel update messages from OR to $S^\ell$ in parallel compute max-marginals by summing incoming messages to each variable This loop is repeated, finally generating max-marginal differences of $S^\ell, W^\ell, R^\ell$ for each layer. Note that while this is an example of a particular message updating technique, this technique may be modified in any manner. For example, updates could be serial (instead of parallel), the damping factor could be different (lambda could take other values between zero and one, not necessarily 0.5) and the order of the updates could be modified (for instance, we could update the messages for a given layer multiple times, or we could update the message to W only once in a while, etc.)

In a second example, multiple forward and backward/reverse transformations can be performed, such as described in U.S. application Ser. No. 14/822,730, filed Aug. 10, 2015, which is incorporated herein in its entirety by this reference.

In iterative learning techniques such as those described above, S230 may include iterating based on any condition (e.g., set time, set number of iterations, result achieving a threshold, etc.).

Figure 9A:
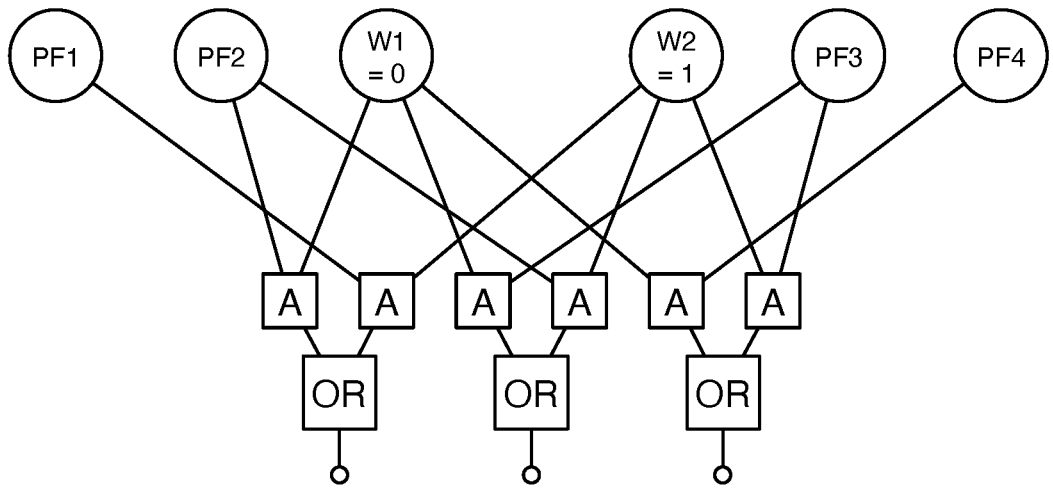
FIG. 9A is a factor graph representation of connections of a hierarchical compositional network of an invention embodiment.
Figure 9B:
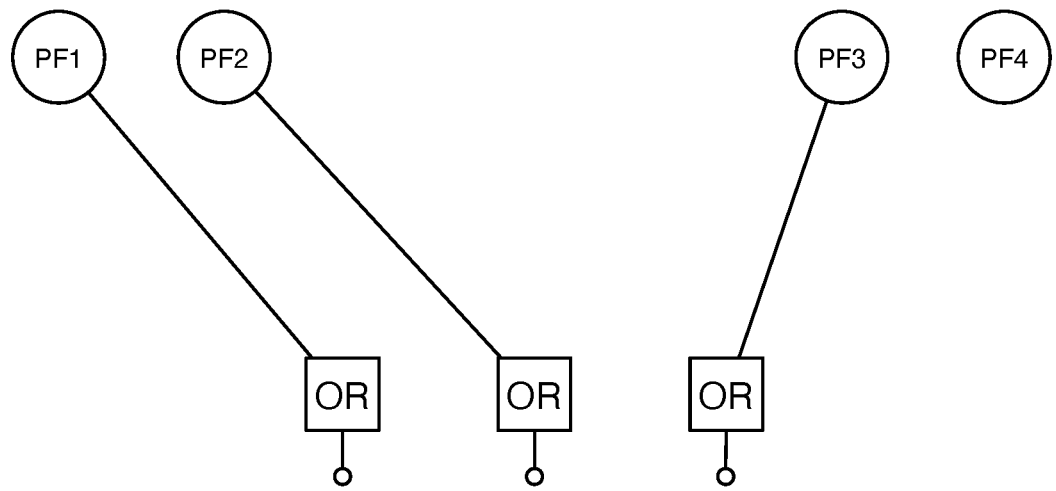
FIG. 9B is a functional equivalent representation of connections of a hierarchical compositional network of an invention embodiment.

After the learning algorithm has completed, the max-marginal differences of $W^\ell$ may be used to fix W in the HCN; for example S230 may include setting values of W to binary values based on a set threshold, and then hard-coding these binary values into the HCN by removing AND factor nodes as appropriate (as shown in the conversion from FIG. 9A to FIG. 9B).

Note that while the preceding paragraphs describe batch learning processes, S230 may additionally or alternatively include performing online learning by storing messages sent to W during training on one training element (or set of training elements) and using these stored messages to aid in training on later training elements.

S240 includes generating a CNN from the HCN parameters. S240 includes copying the binary weights learned by an HCN to a CNN with linear activations. S240 takes advantage of the similarities in HCN and CNN performance; thus, HCN parameters can be used to create either or both of trained CNNs and trained HCNs.

The methods of the preferred embodiment and variations thereof can be embodied and/or implemented at least in part as a machine configured to receive a computer-readable medium storing computer-readable instructions. The instructions are preferably executed by computer-executable components preferably integrated with a hierarchical compositional network. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

I claim:

1. A system comprising one or more computers and one or more non-transitory computer readable storage media having stored thereon software instructions that, when executed by the one or more computers, cause the one or more computers to perform operations comprising:
generatively training a compositional neural network, wherein the compositional neural network comprises a hierarchical graph of sub-networks, wherein each sub-network is configured to generate an output representation based on one or more input representations, wherein the input representation of a higher-level sub-network comprises a representation output by an adjoining lower-level sub-network in the hierarchical graph, each sub-network comprising:
a convolutional layer comprising a set of convolutional weights, the convolutional layer being configured to selectively activate units of the representation based on a set of convolution variables comprising the set of convolutional weights; and
a pooling layer configured to generate the output representation based on the set of activated units and a set of corresponding pool factor values;
wherein training the compositional neural network comprises:
receiving a set of labelled training images; and
based on the set of labelled training images, updating the convolution weights and pool factor values of sub-networks of the hierarchical graph using an iterative max-product message passing algorithm, and wherein, for each labelled training image, the max-product message passing algorithm performs at least one backward-pass update iteration between adjoined sub-networks of the hierarchical graph to update a plurality of variables comprising the convolution weights and pool factor values of sub-networks of the hierarchical graph based on incoming messages at each variable of the plurality of variables in accordance with different update schedules between components of each layer of the hierarchical graph.

2. The system of claim 1, wherein training the compositional neural network simultaneously updates pool factor values and convolution weights within a single update loop iteration.

3. The system of claim 2, wherein training the compositional neural network simultaneously updates pool factor values and convolution weights of all sub-networks of the hierarchical graph.

4. The system of claim 1, wherein training the compositional neural network simultaneously maximizes a joint probability of the convolutional weights and pool factor values across multiple labelled training images of the set.

5. The system of claim 1, wherein, for each labelled training image, the max-product message passing algorithm performs multiple forward-pass and backward-pass update iterations between the adjoined sub-networks of the hierarchical graph.

6. The system of claim 5, wherein training the compositional neural network further comprises generating a supervised or semi-supervised training output based on a forward-pass message or a backward-pass message.

7. The system of claim 1, wherein training the compositional neural network learns the plurality of variables comprising the convolution weights and pool factor values of sub-networks of the hierarchical graph, wherein the iterative max-product message passing algorithm maximizes a joint probability by summing the incoming messages at each variable of the plurality to compute a max-marginals difference.

8. The system of claim 7, wherein the plurality of variables further comprises lateral constraint factors which constrain pool factor values within the respective pooling layers of at least one sub-network of the hierarchical graph.

9. The system of claim 7, wherein the convolution weights are latent variables, each comprising a respective distribution.

10. The system of claim 1, wherein the output of a highest-level sub-network of the hierarchical graph comprises an image classification.

11. The system of claim 10, wherein the sub-networks comprise a set of image classifiers, wherein the convolution weights and pool factors are updated simultaneously, wherein updating the convolution weights and pool factor values comprises loopy belief revision of at least on image classifier of the set.

12. The system of claim 10, wherein the input representation of a lowest-level subnetwork comprises image pixel data.

13. The system of claim 1, wherein the convolution weights are binary variables.

14. The system of claim 1, wherein the selective activation of units of the representation is linear.

15. The system of claim 1, wherein the set of convolution weights represent features of the representation.

16. The system of claim 15, wherein the representation comprises feature locations, wherein the set of convolution variables comprises a sparsification based on the feature locations.

17. The system of claim 1, wherein performing at least one backward-pass update iteration between the adjoined sub-networks of the hierarchical graph to update the plurality of variables in accordance with the different update schedules comprises:
updating incoming messages at the convolution weights of the sub-networks of the hierarchical graph in serial, and
updating incoming messages at the pool factor values of the sub-networks of the hierarchical graph in parallel.

18. One or more non-transitory computer readable storage media having stored thereon software instructions that, when executed by a processing system comprising one or more computers, cause the processing system to perform operations comprising:
generatively training a compositional neural network, wherein the compositional neural network and comprises a hierarchical graph of subnetworks, wherein each sub-network is configured to generate an output representation based on one or more input representations, wherein the input representation of a higher-level sub-network comprises a representation output by an adjoining lower-level sub-network in the hierarchical graph, each sub-network comprising:
a convolutional layer comprising a set of convolutional weights, the convolutional layer being configured to selectively activate units of the representation based on a set of convolution variables comprising the set of convolutional weights; and
a pooling layer configured to generate the output representation based on the set of activated data units and a set of corresponding pool factor values;
wherein training the compositional neural network comprises:
receiving a set of labelled training images; and
based on the set of labelled training images, updating the convolution weights and pool factor values of sub-networks of the hierarchical graph using an iterative max-product message passing algorithm, and wherein, for each labelled training image, the max-product message passing algorithm performs at least one backward-pass update iteration between adjoined sub-networks of the hierarchical graph to update a plurality of variables comprising the convolution weights and pool factor values of sub-networks of the hierarchical graph based on incoming messages at each variable of the plurality of variables in accordance with different update schedules between components of each layer of the hierarchical graph.

19. The system of claim 18, wherein training the compositional neural network simultaneously updates pool factor values and convolution weights within a single update loop iteration.

20. The system of claim 18, wherein training the compositional neural network further comprises receiving a set of audio or natural language text training data.

21. A computer-implemented method comprising:
generatively training a compositional neural network, wherein the compositional neural network comprises a hierarchical graph of sub-networks, wherein each sub-network is configured to generate an output representation based on one or more input representations, wherein the input representation of a higher-level sub-network comprises a representation output by an adjoining lower-level sub-network in the hierarchical graph, each sub-network comprising:
a convolutional layer comprising a set of convolutional weights, the convolutional layer being configured to selectively activate units of the representation based on a set of convolution variables comprising the set of convolutional weights; and
a pooling layer configured to generate the output representation based on the set of activated units and a set of corresponding pool factor values;
wherein training the compositional neural network comprises:
receiving a set of labelled training images; and
based on the set of labelled training images, updating the convolution weights and pool factor values of sub-networks of the hierarchical graph using an iterative max-product message passing algorithm, and wherein, for each labelled training image, the max-product message passing algorithm performs at least one backward-pass update iteration between adjoined sub-networks of the hierarchical graph to update a plurality of variables comprising the convolution weights and pool factor values of sub-networks of the hierarchical graph based on incoming messages at each variable of the plurality of variables in accordance with different update schedules between components of each layer of the hierarchical graph.

* * * * *